United States Patent Office 2,852,529
Patented Sept. 16, 1958

2,852,529

INTERMEDIATES FOR THE SYNTHESIS OF ALDOSTERONE

George I. Poos, North Plainfield, N. J., assignor to Merck & Co., Inc., Rahway, N. J., a corporation of New Jersey No Drawing. Original application September 26, 1955, Serial No. 536,775. Divided and this application November 30, 1955, Serial No. 550,213

8 Claims. (Cl. 260—340.9)

This application is a division of my copending application Serial No. 536,775, filed September 26, 1955.

This invention relates to the synthesis of dl-aldosterone and particularly to new intermediates and to the processes for preparing them which are useful in such synthesis.

Adrenal glands functioning normally produce various hormones which are essential to physical well being. Some of these hormones, such as cortisone and hydrocortisone, have been identified, and their contribution to essential body processes has been evaluated. Hormone therapy in diseases caused by impairment of adrenal function is not entirely adequate, as none of the active hormones presently available is a suitable substitute for the mineral-regulating function of the adrenal glands.

In the past years considerable effort has been expended to isolate and identify the hormone contained in an "amorphous fraction" isolated from adrenal glands, which is responsible for the mineral-regulating function of these glands. These amorphous fractions were first reported by O. Wintersteiner, H. M. Vars and J. J. Pfiffner, in J. Biol. Chem. 105 (1934) and subsequently by E. C. Kendall, H. L. Mason, W. J. Hoehn, and B. F. McKenzie, in J. Biol. Chem. 119, lvi (1937), as well as by other research workers. Recently T. Reichstein et al. in Experientia, vol. 9, pages 333–335 (1953), announced the isolation of the mineral-regulating hormone and called it aldosterone. Aldosterone can be synthesized by the following series of reactions:

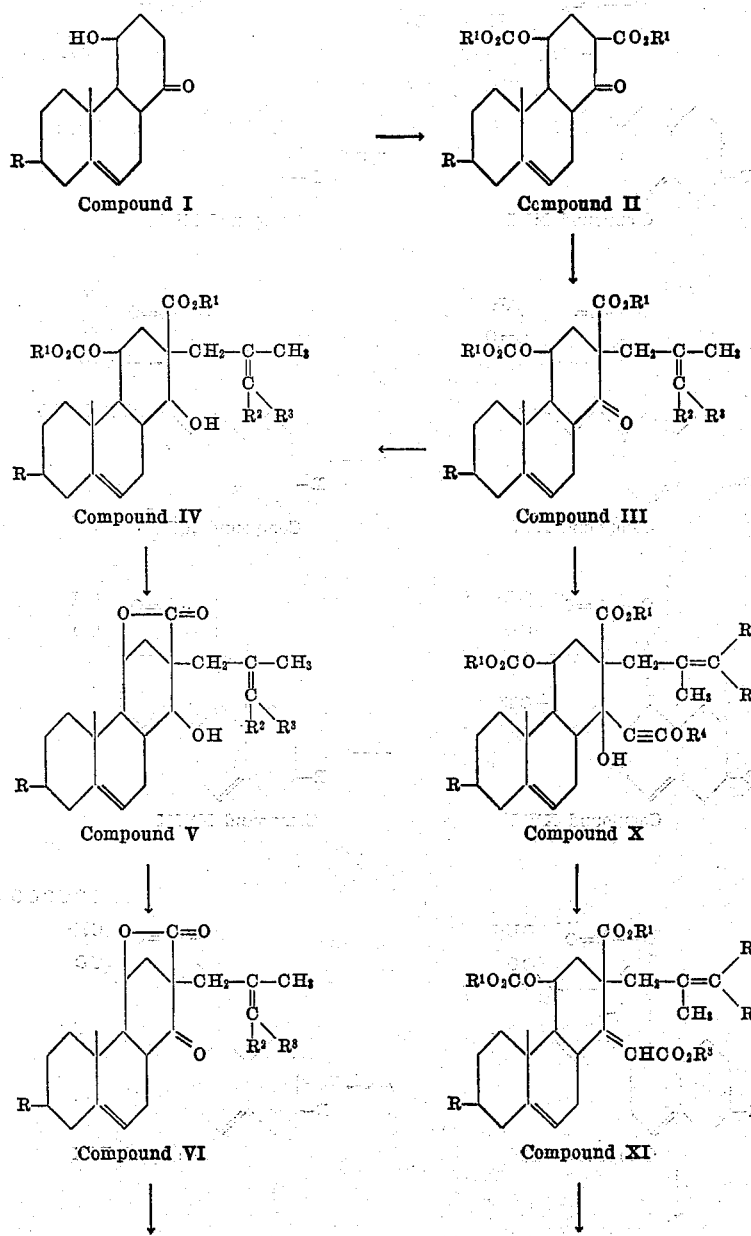

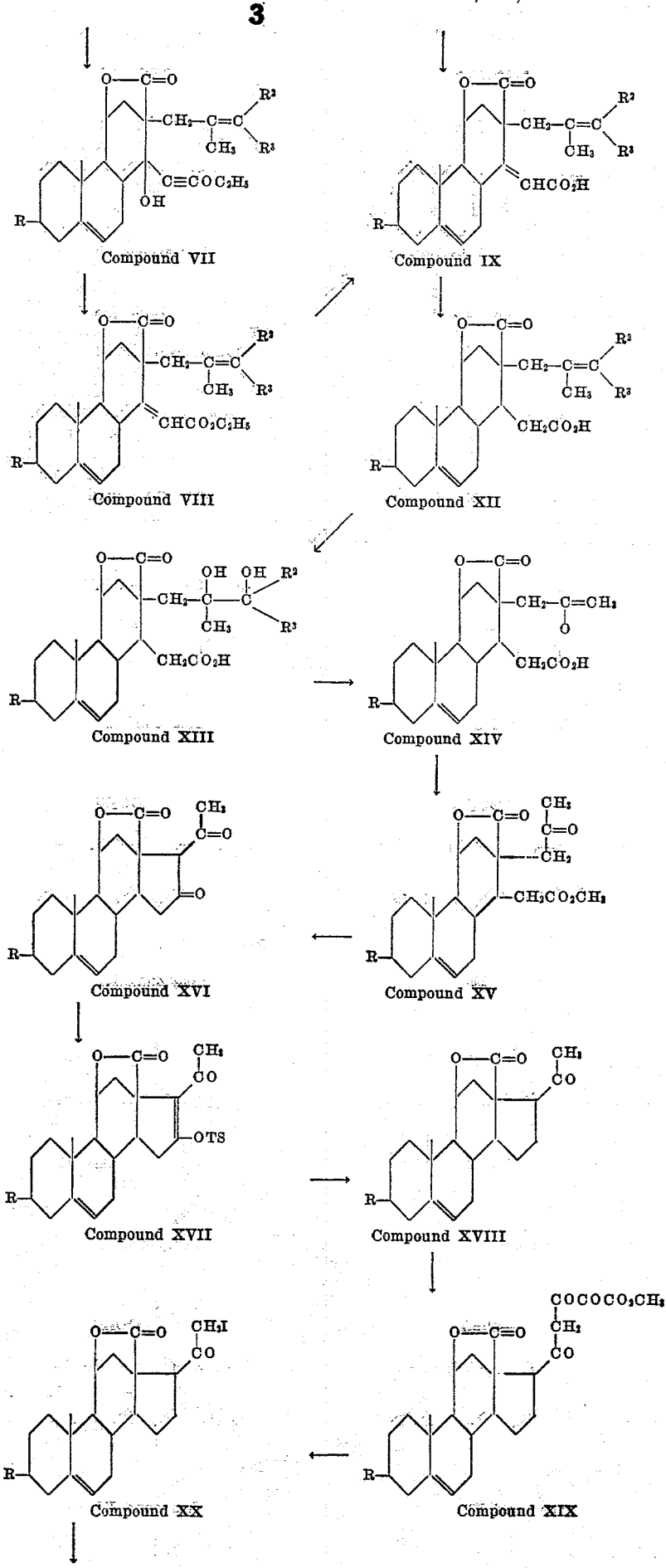

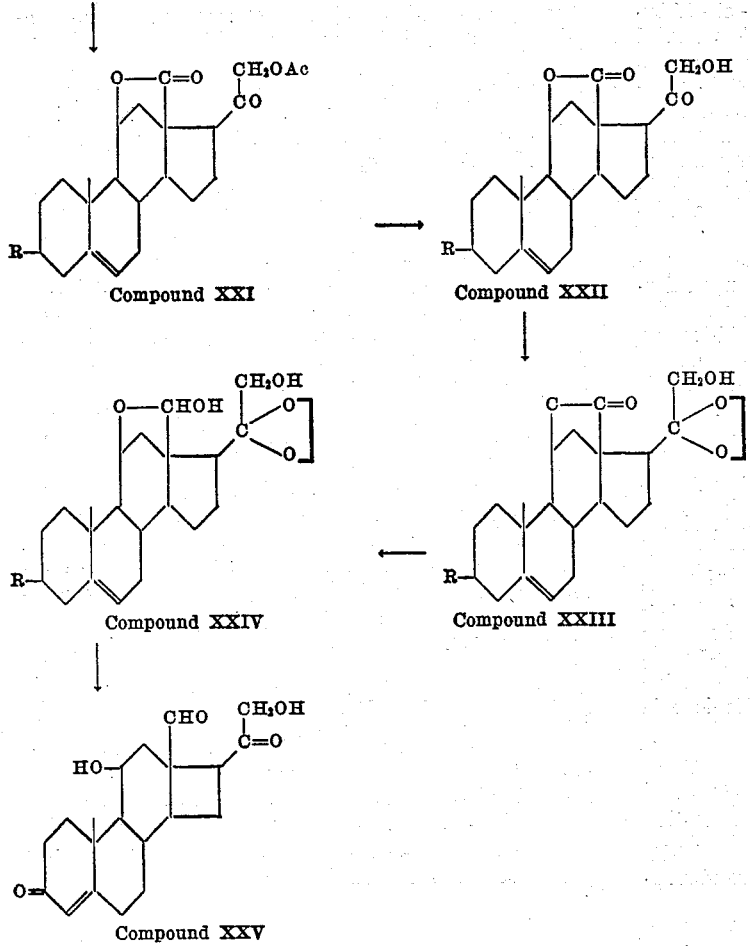

in the above formulae R is a ketal substituent convertible to keto by hydrolysis, and R¹ and R⁴ are hydrocarbon groups and R² and R³ are hydrogen or hydrocarbon groups.

The reactions indicated are conducted as follows: 4b-methyl - 7 - R - 1,2,3,4,4a,4b,5,6,7,8,10,10a - dodecahydrophenanthrene-4-ol-1-one (Compound I) is reacted with a dialkyl carbonate to form the 4-alkyl carbonate of 4b-methyl-2-carboalkoxy-7-R-1,2,3,4,4a,4b,5,6,7,8,10,10a - dodecahydrophenanthrene - 4 - ol - 1 - one (Compound II). This latter compound is treated with a 2-methyl allylic halide in the presence of a base to form the 4-alkyl carbonate of 4b-methyl-2-carboalkoxy-2-alkenyl-7 - R - 1,2,3,4,4a,4b,5,6,7,8,10,10a - dodecahydrophenanthrene-4-ol-1-one (Compound III). This compound is then reacted with an alkali metal borohydride to produce the 4-alkyl carbonate of 4b-methyl-2-carboalkoxy-2 - alkenyl - 7 - R - 1,2,3,4,4a,4b,5,6,7,8,10,10a - dodecahydrophenanthrene-1,4-diol (Compound IV), which is reacted with a base to form the 4-lactone of 4b-methyl-2-carboxy - 2 - alkenyl - 7 - R - 1,2,3,4,4a,4b,5,6,7,8,10,10a-dodecahydrophenanthrene-1,4-diol (Compound V) which upon reaction with an oxidizing agent yields the corresponding 1-keto-compound (Compound VI). This latter compound is then reacted with ethoxyacetylene magnesium bromide to produce the 4-lactone of 4b-methyl-1 - ethoxyethinyl - 2 - carboxy - 2 - alkenyl - 7 - R-1,2,3,4,4a,4b,5,6,7,8,10,10a - dodecahydrophenanthrene-1,4-diol (Compound VII) which upon treatment with dilute sulfuric acid yields the 4-lactone of 4b-methyl-1-carbethoxymethylene - 2 - carboxy - 2 - alkenyl - 7 - R-1,2,3,4,4a,4b,5,6,7,8,10,10a - dodecahydrophenanthrene-4-ol (Compound VIII), which upon refluxing with potassium carbonate forms the 2,4-lactone of 4b-methyl-1-carboxymethylene - 2 - carboxy - 2 - alkenyl - 7 - R-1,2,3,4,4a,4b,5,6,7,8,10,10a - dodecahydrophenanthrene- 4-ol (Compound IX). Alternatively the 4-alkyl carbonate of 4b-methyl-2-carboalkoxy-2-alkenyl-7-R-1,2,3,4,4a,4b,5,6,7,8,10,10a - dodecahydrophenanthrene - 4 - ol-1-one (Compound III) can be reacted with an alkoxyacetylene magnesium bromide to produce the 4-alkyl carbonate of 4b-methyl-1-alkoxyethinyl-2-carboalkoxy-2-alkenyl - 7 - R - 1,2,3,4,4a,4b,5,6,7,8,10,10a - dodecahydrophenanthrene-1,4-diol (Compound X) which is treated with sulfuric acid to form the 4-alkyl carbonate of 4b-methyl - 1 - carboalkoxymethylene - 2 - carboalkoxy - 2-alkenyl - 7 - R - 1,2,3,4,4a,4b,5,6,7,8,10,10a - dodecahydrophenanthrene-4-ol (Compound XI), which is then refluxed with potassium hydroxide to produce the 2,4-lactone of 4b-methyl-1-carboxymethylene-2-carboxy-2-alkenyl - 7 - R - 1,2,3,4,4a,4b,5,6,7,8,10,10a-dodecahydrophenanthrene-4-ol (Compound IX). The latter compound is then suspended in liquid ammonia and treated with potassium metal to produce the 2,4-lactone of 4b-methyl - 1 - carboxymethyl - 2 - carboxy - 2 - alkenyl-7 - R - 1,2,3,4,4a,4b,5,6,7,8,10,10a - dodecahydrophenanthrene-4-ol (Compound XII), which is then reacted with osmium tetraoxide and then the osmate ester is hydrolized by the addition of aqueous sodium sulfite to produce the 2,4-lactone of 4b-methyl-1-carboxymethyl-2-carboxy - 2 - (2 - methyl - 2,3 - dihydroxypropyl) - 7 - R-1,2,3,4,4a,4b,5,6,7,8,10,10a - dodecahydrophenanthrene-4-ol (Compound XIII). The glycol acid is treated with a solution of paraperiodic acid to produce the 4-lactone of 4b - methyl - 1 - carboxymethyl - 2 - carboxy - 2-acetonyl - 7 - R - 1,2,3,4,4a,4b,5,6,7,8,10,10a - dodecahydrophenanthrene-4-ol (Compound XIV), which upon treatment with anhydrous potassium carbonate and methyl iodide yields the 4-lactone of 4b-methyl-1-carbomethoxymethyl - 2 - carboxy - 2 - acetonyl - 7 - R-1,2,3,4,4a,4b,5,6,7,8,10,10a - dodecahydrophenanthrene-4-ol (Compound XV). This compound is reacted with sodium methoxide in benzene to produce the 11-lactone of DL - 18 - carboxy - 3 - R - 5 - pregnene - 11 - ol - 16,20-dione (Compound XVI). The pregnene is then treated with p-toluene sulfonyl chloride to produce the 11-lactone of DL - 18 - carboxy - 16 - tosyloxy - 3 - R - 5,16 - pregnadiene-11-ol-20-one (Compound XVII). The pregnadiene is then hydrogenated using palladium on barium carbonate as the hydrogenation catalyst to produce the 11 - lactone of DL-18-carboxy-3-R-5-pregnene-11-ol-20-one (Compound XVIII), which is reacted with a mixture of sodium methoxide and methyl oxalate to produce the 11-lactone-21-methyl-glyoxalate of DL-3-R-5-pregnene-11-ol-20-one (Compound XIX), which upon formation of the sodium salt followed by treatment with iodine and then sodium methoxide yields the 11-lactone of DL - 21 - iodo - 18 - carboxy - 3 - R - 5 - pregnene-11-ol-20-one (Compound XX). This latter compound is then reacted with potassium bicarbonate and glacial acetic acid to form the 11-lactone of DL-18-carboxy-3-R-5-pregnene-11,21-diol-20-one acetate (Compound XXI), which upon reaction with sodium methoxide yields the 11-lactone of DL-18-carboxy-3-R-5-pregnene-11,21-diol-20-one (Compound XXII). This latter compound is then heated with ethylene glycol and p-toluene sulfonic acid with removal of water to form the 11-lactone of DL-18-carboxy-3-R-20-ethylenedioxy-5-pregnene-11,21-diol (Compound XXIII), which is reacted with lithium aluminum hydride to form DL-18-oxo-3-R-20-ethylenedioxy-5-pregnene-11,21-diol (Compound XXIV), which upon reaction with a mixture of acetone and p-toluene sulfonic acid yields DL-aldosterone (Compound XXV).

An an alternate synthesis 4b-methyl-2-carbomethoxy-7 - R - 1,2,3,4,4a,4b,5,6,7,8,10,10a - dodecahydrophenanthrene-1,4-dione (Compound XXVI) is reacted with a 2-methyl allylic halide in the presence of a base to form the corresponding 4b-methyl-2-carboalkoxy-2-alkenyl-7-R-1,2,3,4,4a,4b,5,6,7,8,10,10a - dodecahydrophenanthrene-1,4-dione (Compound XXVII). This latter compound is then reacted with an alkoxyacetylene magnesium bromide to form the 4-alkyl carbonate of 4b-methyl-1-alkoxyethinyl -2-carboalkoxy-2-alkenyl-7-R-1,2,3,4,4a,4b,5,6,7,8, 10,10a-dodecahydrophenanthrene-1-ol-4-one (Compound XXVIII) which is then treated with dilute sulfuric acid in tetrahydrofuran to form the 4-alkyl carbonate of 4b-methyl-1-carboalkoxymethylene-2-carboalkoxy-2-alkenyl-7 - R - 1,2,3,4,4a,4b,5,6,7,8,10,10a - dodecahydrophenanthrene - 4 - one (Compound XXIX). This compound is then treated with potassium carbonate to form the 4-alkyl carbonate of 4b - methyl - 1 - carboxymethylene - 2-carboalkoxy - 2 - alkenyl - 7 - R - 1,2,3,4,4a,4b,5,6,7,8,10,10a - dodecahydrophenanthrene - 4 - one (Compound XXX), which upon treatment with sodium borohydride yields the 4-alkyl carbonate of 4b - methyl - 1 - carboxymethylene - 2 - carboalkoxy - 2 - alkenyl - 7 - R - 1,2,3,4, 4a,4b,5,6,7,8,10,10a - dodecahydrophenanthrene - 4α - ol (Compound XXXI). The reduced compound is then treated with potassium metal in liquid ammonia to form 4-alkyl carbonate of 4b-methyl-1-carboxymethyl-2-carboalkoxy - 2 - alkenyl - 7 - R - 1,2,3,4,4a,4b,5,6,7,8,10,10a-dodecahydrophenanthrene-4α-ol (Compound XXXII), which is oxidized with chromium trioxide-pyridine complex to form 4b-methyl-1-carboxymethyl-2-carboalkoxy-2 - alkenyl - 7 - R - 1,2,3,4,4a,4b,5,6,7,8,10,10a - dodecahydrophenanthrene - 4 - one (Compound XXXIII) and further reduced with sodium borohydride to form 4b-methyl - 1 - carboxymethyl - 2 - carboalkoxy - 2 - alkenyl-7 - R - 1,2,3,4,4a,4b,5,6,7,8,10,10a - dodecahydrophenanthrene - 4β - ol (Compound XXXIV). This latter compound is treated with potassium hydroxide to form the 2,4-lactone of 4b-methyl-1-carboxymethyl-2-carboxy-2-alkenyl - 7 - R - 1,2,3,4,4a,4b,5,6,7,8,10,10a - dodecahydrophenanthrene - 4 - ol (Compound XII). The alternate process can be illustrated as follows:

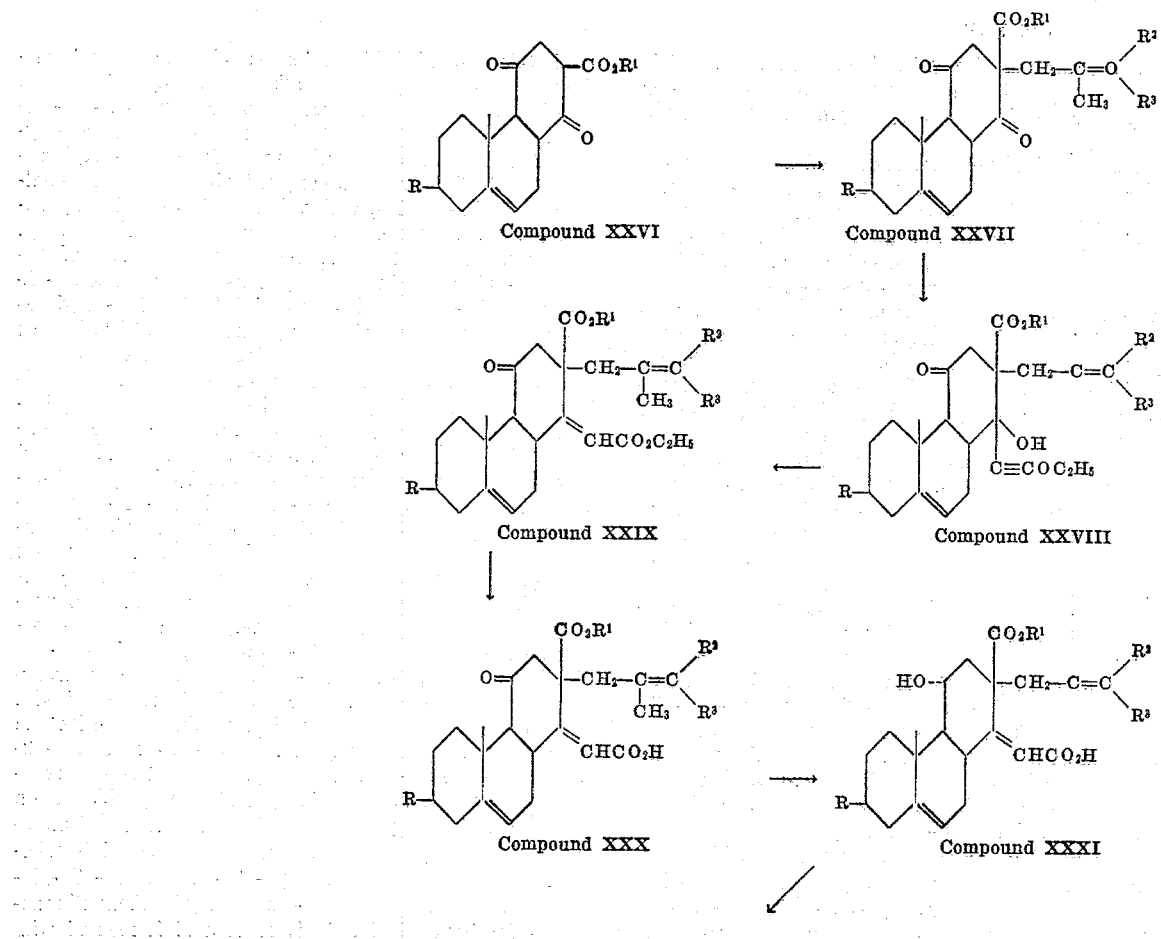

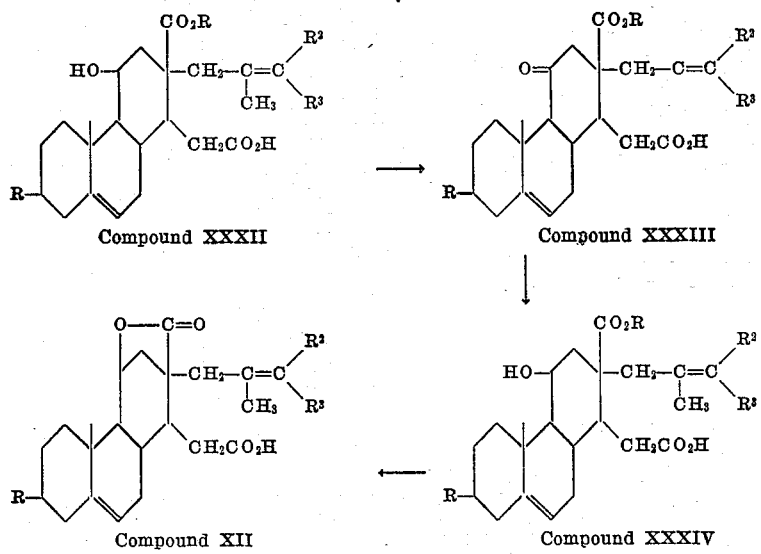

Compound XXXII   Compound XXXIII

Compound XII   Compound XXXIV

This invention is concerned with the process of converting the 4-alkyl carbonate of 4b - methyl - 2 - carboalkoxy- 7 - R - 1,2,3,4,4a,4b,5,6,7,8,10,10a - dodecahydrophenanthrene - 4 - ol - 1 - one (Compound II) to the 4-lactone of 4b - methyl - 2 - carboxy - 2 - alkenyl - 7 - R - 1,2,3,4, 4a,4b,5,6,7,8,10,10a - dodecahydrophenanthrene - 4 - ol - 1 - one (Compound VI), the conversion of 4-alkyl carbonate of 4b - methyl - 2 - carboalkoxy - 2 - alkenyl - 7 - R - 1,2,3,4,4a,4b,5,6,7,8,10,10a - dodecahydrophenanthrene- 4 - ol - 1 - one (Compound III) to the 4-alkyl carbonate of 4b - methyl - 1 - alkoxyethinyl - 2 - carboalkoxy - 2 - alkenyl - 7 - R - 1,2,3,4,4a,4b,5,6,7,8,10,10a - dodecahydrophenanthrene - 1,4 - diol (Compound X), to the conversion of 4b - methyl - 2 - carbomethoxy - 7 - R - 1,2,3, 4,4a,4b,5,6,7,8,10,10a - dodecahydrophenanthrene - 1,4- dione (Compound XXVI) to 4b - methyl - 2 - carboalkoxy - 2 - alkenyl - 7 - R - 1,2,3,4,4a,4b,5,6,7,8,10,10a- dodecahydrophenanthrene-1,4-dione (Compound XXVII) and to the intermediate and final compounds produced.

The 7-keto group is protected by the formation of a 7-ketal derivative which can be readily hydrolyzed to form the keto group. Suitable ketone derivatives for this purpose which might be mentioned are enol ethers and cyclic ketals. Thus, enol ether derivatives of the formula R′O— wherein R′ is a hydrocarbon radical such as alkyl, aryl, aralkyl and alicyclic, preferably those containing from one to eight carbon atoms and not having any functional substituents can be used. The methyl and ethyl enol ethers which are readily prepared are particularly suitable in this regard. With the formation of the enol ether derivative an additional double bond is formed at position 8a thereby forming a compound having the basic formula 4b-methyl-1,2,3,4,4a,4b,5,6,7,9,10,10a- dodecahydrophenanthrene. Cyclic ketal derivatives, such as the 7-ethylenedioxy derivative of the formula

the corresponding mono-thio keto derivative of the formula

and the corresponding dithio keto derivative of the formula

also can be used. When the ketal is the dithio derivatives the double bond is in the 8 (8a)-position, whereas with the other cyclic ketals it is in the 8a-position. Similarly, other cyclic ketal derivatives such as the trimethylene, propylene and butylene ketals can be used to protect the 7-keto substituent. Suitable ketals have carbon chains of from two to six carbon atoms. Upon hydrolyzing enol and keto derivatives with acid the protecting substituent is cleaved and the usual 7-keto group formed.

The 4-alkyl carbonate of 4b-methyl-2-carboalkoxy-7- R-1,2,3,4,4a,4b,5,6,7,8,10,10a - dodecahydrophenanthrene- 4-ol-1-one is reacted with a 2-methyl allylic halide in the presence of a base to form the 4-alkyl carbonate of 4b- methyl - 2 - carboalkoxy - 2 - alkenyl - 7 - R - 1,2,3,4,4a, 4b,5,6,7,8,10,10a - dodecahydrophenanthrene - 4 - ol - 1- one. The reaction with the 2-methyl allylic halide is most conveniently effected in an organic solvent. The base is probably an alkali metal or alkaline earth metal carbonate or bicarbonate which in water does not have a pH above 10. Other bases can be used, however, with careful control of the reaction conditions. Typical examples of such bases are sodium carbonate, sodium bicarbonate, potassium carbonate, potassium bicarbonate, calcium carbonate, calcium bicarbonate, magnesium carbonate, magnesium bicarbonate and the like. Suitable organic solvents are acetone, methyl ethyl ketone, dioxane, methanol, ethanol, propanol, benzene, toluene, xylene and the like. In carrying out this reaction it is desirable to use the iodide derivative of the 2-methyl allylic halide, since the use of the iodide compound usually results in the obtaining of maximum yields of the desired products under optimum conditions, although other halides such as the bromide and chloride can also be used. It is usually desirable to employ an amount of the halide in excess of that theoretically required to obtain maximum yields. Thus the dodecahydrophenanthrene compound can be reacted with an unsaturated aliphatic hydrocarbon halide to form the corresponding dodecahydrophenanthrene having the unsaturated aliphatic hydrocarbon radical in the 2-position. Typical examples of 2-methyl allylic halides are those having the formula

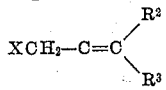

wherein X is halogen $R^2$ and $R^3$ are hydrogen or alkyl groups containing from one to eight carbon atoms such as 2-methallyl iodide, 2-methallyl bromide, 2-methyl-2- butene-1-iodide, 2,3,3-trimethyl-allyl bromide, 2-methyl- 2 - pentene - 1 - iodide, 2 - methyl - 3 - propyl - allyl iodide, 2 - methyl - 2 - heptene - 1 - iodide, 2 - methyl- 2-hexene-1-iodide and the like. The reaction is preferably carried out at about room temperature, although higher or lower temperatures can be used effectively. At the preferred temperature the reaction is usually complete in less than one hour. The product can be easily recovered by pouring the reaction mixture into water, extracting it with ether, and evaporating the ethereal extracts to dryness. Examples of the compounds that are prepared in this manner are 4-methyl-carbonate of 4b-methyl-2-carbomethoxy - 2 - methallyl - 7 - ethylenedioxy - 1,2,3,4, 4a,4b,5,6,7,8,10,10a - dodecahydrophenanthrene - 4 - ol- 1 - one; 4 - methylcarbonate of 4b - methyl - 2 - carbethoxy - 2 - methallyl - 7 - ethylenedioxy - 1,2,3,4,4a,4b, 5,6,7,8,10,10a - dodecahydrophenanthrene - 4 - ol - 1- one; 4 - methylcarbonate of 4b - methyl - 2 - carbomethoxy - 2 - (2 - methyl - 2 - butenyl) - 7 - ethylenedioxy - 1,2,3,4,4a,4b,5,6,7,8,10,10a - dodecahydrophenanthrene - 4 - ol - 1 - one; 4 - ethylcarbonate of 4b- methyl - 2 - carbethoxy - 2 - methallyl - 7 - ethylenedithio- 1,2,3,4,4a,4b,5,6,7,9,10,10a - dodecahydrophenanthrene- 4 - ol - 1 - one; 4 - propyl carbonate of 4b - methyl- 2 - carbopropoxy - 2 - methallyl - 7 - ethylenethioxy - 1, 2,3,4,4a,4b,5,6,7,8,10,10a - dodecahydrophenanthrene - 4- ol - 1 - one; 4 - butyl carbonate of 4b - methyl - 2- carbobutoxy - 2 - methallyl - 7 - methoxy - 1,2,3,4,4a,4b, 5,6,10,10a - decahydrophenanthrene - 4 - ol - 1 - one; 4- ethyl carbonate of 4b-methyl-2-carbethoxy-2-(2-methyl- 3 - propyl - allyl) - 7 - ethylenedioxy - 1,2,3,4,4a,4b,5,6, 10,10a - decahydrophenanthrene - 4 - ol - 1 - one; 4- methylcarbonate of 4b - methyl - 2 - carbomethoxy - 2- (2,3,3 - trimethyl - allyl) - 7 - ethylenedioxy - 1,2, 3,4,4a,4b,5,6,7,8,10,10a - dodecahydrophenanthrene - 4- ol - 1 - one; 4 - benzyl carbonate of 4b - methyl - 2- carbobenzoxy - 2 methallyl - 7 - ethylenedioxy - 1, 2,3,4,4a,4b,5,6,7,8,10,10a - dodecahydrophenanthrene - 4- ol - 1 - one; 4 - cyclohexyl carbonate of 4b - methyl - 2 - carbocyclohexoxy - 2 - methallyl - 7 - ethylenedioxy - 1,2,3,4,4a,4b,5,6,7,8,10,10a - dodecahydrophenanthrene - 4 - ol - 1 - one; and 4 - methylcarbonate of 4b - methyl - 2 - carbomethoxy - 2 - methallyl - 7 - propoxy - 1,2,3,4,4a,4b,5,6,10,10a - decahydrophenanthrene- 4-ol-1-one.

The 4-alkyl carbonate of 4b-methyl-2-carbalkoxy-2-alkenyl - 7 - R-1,2,3,4,4a,4b,5,6,7,8,10,10a - dodecahydrophenanthrene-4-ol-1-one is reacted with an alkali metal borohydride to form the 4- alkyl carbonate of 4b-methyl- 2 - carbalkoxy-2-alkenyl-7-R-1,2,3,4,4a,4b,5,6,7,8,10,10a-dodecahydrophenanthrene-1,4-diol. The reaction can be carried out in a solvent such as water, methanol, ethanol, tetrahydrofuran and the like or mixtures thereof. The temperature of the reaction may vary from about 0° to 100° C., but it is preferably carried out at about approximately room temperature (20–30° C.). The reaction usually requires from eight to sixteen hours for completion, although longer or shorter periods can be used. The alkali metal borohydride, which is preferably used in excess of the equivalent amount, is a boron compound having alkali metal associated with a group consisting of a boron atom having at least one and up to four reactive hydrogen atoms. When there are less than four hydrogen atoms, the group containing the boron atom may contain one to three atoms other than hydrogen or one to three radicals, which atoms or radicals are relatively inert and non-reactive with respect to the reducing action characteristic of the hydrogen atoms of these compounds, or a combination of such atoms other than hydrogen and radicals so long as at least one hydrogen atom is present, and so long as the total number of atoms including hydrogen is four. Typical examples of such compounds are sodium borohydride, lithium borohydride, sodium triethyl borohydride, potassium triethyl borohydride and potassium borohydride. The product can be readily recovered by diluting with water and evaporating the solvent under vacuum. The aqueous residue can then be extracted with ethyl ether, chloroform, ethylene chloride, ethyl acetate and the like and the extract dried with magnesium sulfate and the solvent evaporated.

The 4-alkyl carbonate of 4b-methyl-2-carbalkoxy-2-alkenyl - 7 - R-1,2,3,4,4a,4b,5,6,7,8,10,10a-dodecahydrophenanthrene-1,4-diol is reacted with a base to form 4b-methyl - 2-carboxy-2-alkenyl-7-R-1,2,3,4,4a,4b,5,6,7,8,10, 10a-dodecahydrophenanthrene-1,4-diol which lactonizes to form the 4-lactone thereof. Any of the conventional bases can be used such as aqueous alcoholic solutions of alkali or alkaline earth metal hydroxides or carbonates, although it is preferred to use alcoholic solutions of alkali metal hydroxides. Typical examples of suitable bases are sodium hydroxide, potassium hydroxide, sodium carbonate, potassium carbonate, and calcium hydroxide. The reaction is carried out at approximately 0 to 80° C. with 65 to 80° C. being preferred. The reaction is usually complete in one to four hours depending upon the concentration of the base. The reaction can be carried out in any of the usual organic solvents such as the lower alcohols, dioxane, etc., although it is necessary to have a small amount of water present. The product can be conveniently recovered from the reaction mixture by evaporating the solvent and acidifying the aqueous solution with an excess amount of a weak acid salt (pH above about 4.5) such as a mono alkali metal salt of a tribasic acid as for example sodium dihydrogen phosphate.

The 4-lactone of 4b-methyl-2-carboxy-2-alkenyl-7-R-1,2,3,4,4a,4b,5,6,7,8,10,10a - dodecahydrophenanthrene-1,4-diol is oxidized to produce the corresponding 4-lactone of 4b-methyl-2-carboxy-2-alkenyl-7-ethylene-dioxy-1,2,3,4,4a,4b,5,6,7,8,10,10a - dodecahydrophenanthrene-4-ol-1-one. The oxidizing agent can be compounds of hexa-valent chromium such as chromic acid, chromium trioxide and also an excess of ketone with aluminum t-butoxide. The reaction is preferably carried out under neutral or mildly alkaline conditions in a solvent such as pyridine, cyclohexanone, benzene or the like. The preferred oxidizing agents are chromium trioxide and chromium trioxide-pyridine complex. The reaction proceeds favorably at 0 to 80° C. with 20–40° C. being most convenient. The reaction requires from one to twenty hours for completion. The product is conveniently recovered by diluting with water and extracting with ethyl ether. The ethyl ether solution is then washed with water, dried over magnesium sulfate and concentrated to dryness in vacuo.

The 4-alkyl carbonate of 4b-methyl-2-carboalkoxy-2-alkenyl - 7 - R-1,2,3,4,4a,4b,5,6,7,8,10,10a-dodecahydrophenanthrene-4-ol-1-one is reacted with alkoxy acetylene magnesium halide to form 4-alkyl carbonate of 4b-methyl - 1-alkoxyethinyl-2-carboalkoxy-7-R-1,2,3,4,4a,4b, 5,6,7,8,10,10a-dodecahydrophenanthrene - 1,4 - diol. The reaction is preferably carried out in a solvent such as benzene, although the Grignard reagent is conveniently prepared in ethereal solution. Other suitable solvents are toluene, xylene, isopropyl ether, tetrahydrofuran, dibutylether, methyl ethyl ether and lower hydrocarbons and mixtures thereof. Alkoxy acetylene magnesium halide is preferably the bromide and is usually used in about two to five times the theoretical amount. The alkoxy group preferably contain from one to four carbon atoms although ethoxy is the most convenient. The reaction is allowed to proceed at room temperature for one-half to eight hours. The product is conveniently recovered by the addition of water, ethyl ether and ice, and just sufficient ammonium chloride solution to break any emulsion. The separated aqueous phase is extracted with ethyl ether and the combined ethereal solutions are dried over magnesium sulfate and concentrated to dryness in vacuo. The product can be further purified by adsorption of a benzene solution onto alkaline alumina and then eluting with an ethyl ether and petroleum ether mixture.

The 4b-methyl-2-carboalkoxy-7-R-1,2,3,4,4a,4b,5,6,7,8, 10,10a-dodecahydrophenanthrene - 1,4 - dione is reacted with a 2-methyl allylic halide in the presence of a base to produce 4b-methyl-2-carboalkoxy-2-alkenyl-7-R-1,2,3,4,4a,4b,5,6,7,8,10,10a - dodecahydrophenanthrene - 1,4-dione. The reaction is most conveniently effected in an organic solvent. The base is preferably an alkali metal or alkaline earth metal carbonate or bicarbonate which in water does not have a pH above 10. Other bases can be used, however, with careful control of the reaction conditions. Typical examples of such bases are sodium carbonate, sodium bicarbonate, potassium carbonate, potassium bicarbonate, calcium carbonate, calcium bicarbonate, magnesium carbonate and the like. Suitable organic solvents are acetone, methyl ethyl ketone, dioxane, methanol, ethanol, propanol, benzene, toluene, xylene, and the like. In carrying out this reaction it is desirable to use the iodide derivative of the 2-methyl allylic halide, since the use of the iodide compound usually results in the obtaining of maximum yields of the desired products under optimum conditions, although other halides such as the bromide and chloride can also be used. It is usually desirable to employ an amount of the halide in excess of that theoretically required to obtain maximum yields. Thus the dodecahydrophenanthrene compound can be reacted with an unsaturated aliphatic hydrocarbon halide to form the corresponding dodecahydrophenanthrene having the unsaturated aliphatic hydrocarbon radical in the 2-position. Typical examples of 2-methyl allylic halides are those having the formula—

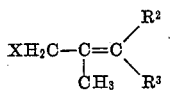

wherein $R^2$ and $R^3$ are hydrogen or alkyl groups containing from one to eight carbon atoms such as 2-methallyl iodide, 2-methallyl bromide, 2-methyl-2-butene-1-iodide, 2,3,3-trimethyl allyl bromide, 2-methyl-2-pentene-1-iodide, 2-methyl-3-propyl allyl iodide, 2-methyl-heptene-1-iodide, 2-methyl-2-hexene-1-iodide and the like. The reaction is preferably carried out at about room temperature, although higher or lower temperatures can be used effectively. At the preferred temperature the reaction is usually complete in less than one hour. The product can be easily recovered by pouring the reaction mixture into water, extracting it with ether, and evaporating the ethereal extracts to dryness. Typical examples of compounds which can be prepared are 4b-methyl - 2 - carbomethoxy - 2- methallyl - 7 - ethylenedioxy - 1,2,3,4,4a,4b,5,6,7,8,10,10a - dodecahydrophenanthrene-1,4-dione; 4b-methyl-2-carbethoxy-2-methallyl-7 - ethylenedioxy - 1,2,3,4,4a,4b,5,6,7,8,10,10a - dodecahydrophenanthrene-1,4-dione; 4b-methyl-2-carbethoxy-2-methallyl - 7 - ethylene - dioxy - 1,2,3,4,4a,4b,5,6,7,8,10,10a-dodecahydrophenanthrene-1,4-dione; 4b-methyl - 2 - carbomethoxy - 2 -(2 - methyl - 2- butenyl) - 7 - ethylenedioxy - 1,2,3,4,4a,4b,5,6,7,8,10,10a - dodecahydrophenanthrene-1,4-dione; 4b-methyl-2-carbethoxy-2-methallyl-7-ethylenedithio - 1,2,3,4,4a,4b,5,6,7,9,10,10a-dodecahydrophenanthrene-1,4-dione; 4b-methyl-2 - carbopropoxy - 2- methallyl - 7 - ethylenedioxy - 1,2,3,4,4a,4b,5,6,8,10,10a-dodecahydrophenanthrene-1,4-dione; 4b-methyl-2-carbobutoxy - 2 - methallyl - 7 - methoxy - 1,2,3,4,4a,4b,5,6,10,10a-decahydrophenanthrene-1,4-dione; 4b-methyl-2-carbethoxy - 2 - (2 - methyl - 3 - propyl - alkyl) - 7-ethoxy - 1,2,3,4,4a,4b,5,6,10,10a - decahydrophenanthrene-1,4-dione; 4b-methyl-2-carbomethoxy-2-(2,3,3-trimethylallyl) - 7 - ethylenedioxy - 1,2,3,4,4a,4b,5,6,7,8,10,10a-dodecahydrophenanthrene-1,4-dione; 4b-methyl-2-carbobenzoxy - 2 - methallyl - 7 - ethylenedioxy - 1,2,3,4,4a,4b,5,6,7,8,10,10a - dodecahydrophenanthrene - 1,4-dione; 4b-methyl-2-carbocyclohexoxy-2-methallyl-7-ethylenedioxy - 1,2,3,4,4a,4b,5,6,7,8,10,10a - dodecahydrophenanthrene-1,4-dione and 4b-methyl-2-carbomethoxy-2 - methallyl - 7 - propoxy - 1,2,3,4,4a,4b,5,6,10,10a-decahydrophenanthrene-1,4-dione.

The 4-alkyl-carbonate of 4b-methyl-2-carbalkoxy-7-R-1,2,3,4,4a,4b,5,6,7,8,10,10a - dodecahydrophenanthrene-4-ol-1-one and 4b-methyl-2-carbalkoxy-7-R-1,2,3,4,4a,4b,5,6,7,8,10,10a-dodecahydrophenanthrene-1,4-dione used as the starting material are prepared by reacting 4b-methyl - 7 - R - 1,2,3,4,4a,4b,5,6,7,8,10,10a - dodecahydrophenanthrene-4-ol-1-one or 4b-methyl-7-R-1,2,3,4,4a,4b,5,6,7,8,10,10a-dodecahydrophenanthrene-1,4-dione with a carbonate ester in the presence of an alkaline condensing agent in a non-reactive solvent. For example esters of carbonic acid such as methyl, ethyl, propyl, amyl, benzyl-cyclohexyl and the like can be used to produce the corresponding 2-acyl or 2,4-diacyl derivative. The acylation is most conveniently effected with a lower alcohol ester of carbonic acid having one to three carbon atoms, although it preferably contains from one to eight carbon atoms. Maximum yields are obtained by using methyl carbonate or ethyl carbonate. Various strong alkaline condensing agents such as the alkali metal hydrides, amides or alkoxides can be employed in this condensation. However, it is most convenient to use sodium hydride or sodium amide in a suitable inert solvent medium such as benzene, an ether or a hydrocarbon as for example hexane, cyclohexane, ethyl ether, benzene, toluene and xylene, since under these conditions we have obtained maximum yields of the desired products. The acylation is most conveniently effected by stirring the reaction mixture at room temperature. The formation of the 2-acylated derivative is complete in one to three hours while to obtain the 2,4-diacylated derivatives it is preferred to extend the reaction time beyond three hours. When the 14-diketo compound is acylated higher yields are obtained by conducting the reaction in the absence of oxygen, for example in an atmosphere of nitrogen or another inert gas. The acylated products are readily recovered from the reaction mixture by adding water and aqueous acid and then extracting the product with a suitable immiscible solvent. Although these acylated compounds, which are used as the starting materials for producing the new intermediate, are referred to as 4-alkyl carbonate and/or as having a 2-carbalkoxy substituted, it is to be understood that these groups are not limited to alkyl or alkoxy groups but can have the formula $R''$ and $R''O-$ respectively wherein $R''$ is an alkyl, aryl, aralkyl or alicylic groups and preferably having from one to eight carbon atoms and without any interfering functional substituents.

The following examples are given for the purposes of illustration:

EXAMPLE 1

*4-methylcarbonate of 4b-methyl-2-carbomethoxy-7-ethylenedioxy - 1,2,3,4,4a,4b,5,6,7,8,10,10a - dodecahydrophenanthrene-4-ol-1-one*

Two grams of sodium hydride is crushed to a fine powder under 100 ml. of dry ether covered by an atmosphere of dry nitrogen. To the resulting suspension is added 5.84 grams of 4b-methyl-7-ethylenedioxy-1,2,3,4,4a,4b,5,6,8,10,10a - dodecahydrophenanthrene - 4-ol-1-one (melting point 218–220° C.), 50 ml. of dimethyl carbonate and 3 ml. of absolute methanol. The reaction mixture is stirred under an atmosphere of dry nitrogen at room temperature for four hours. After cooling to 0° C., 60 ml. of absolute methanol is added and the mixture is stirred until all of the excess sodium hydride has reacted (20 minutes). A cold mixture of 50 grams of sodium dihydrogen phosphate, 100 ml. of water and 150 ml. of chloroform is added. The organic phase is separated and the aqueous part is extracted with three 50-ml. portions of chloroform. After washing and drying, the combined extracts are concentrated to dryness in vacuo. Recrystallization of the residue from ether and then methanol afforded pure product, melting point 140–145° C., $\lambda^{MeOH}_{Max.}$ 255 m$\mu$ E mol 11,500; which gives an immediate purple color with alcoholic ferric chloride.

$\lambda_{Max.}^{Nujol}$ 5.75, 6.03, 6.15 and 8.97$\mu$

Chromatography of the mother liquors on silica gel provides an additional amount of product along with a small proportion of 4b-methyl-2-carbomethoxy-7-ethylenedioxy-1,2,3,4,4a,4b,5,6,7,8,10,10a-dodecahydrophenanthrene-4-ol-1-one, purified by recrystallization from methanol. It melts at 181–182° C., has $\lambda_{Max.}^{MeOH}$ 255 m$\mu$ E mol 10,200 and gives an immediate purple color with alcoholic ferric chloride.

$\lambda_{Max.}^{Nujol}$ 2.95, 6.06, 6.17, 8.98$\mu$

EXAMPLE 2

*4-methylcarbonate of 4b-methyl-2-carbomethoxy-2-methallyl)-7-ethylenedioxy-1,2,3,4,4a,4b,5,6,7,8,10,10a-dodecahydrophenanthrene-4-ol-1-one*

Two grams of the 4-methylcarbonate of 4b-methyl-2-carbomethoxy-7-ethylenedioxy-1,2,3,4,4a,4b,5,6,7,8,10,10a-dodecahydrophenanthrene-4-ol-1-one in 40 ml. of acetone is treated with 4.0 grams of potassium carbonate and 4 ml. of 2-methallyl iodide and allowed to stand with stirring at room temperature overnight. Water (100 ml.) is added to the reaction mixture, the acetone is distilled under vacuum and the product is extracted into ether. Evaporation of the dried ether extract followed by crystallization with petroleum ether affords the methylallyl derivative. Recrystallization from methanol and petroleum ether-ether gives pure product, melting point 114–116° C.

$\lambda_{Max.}^{Nujol}$ 5.75, 5.82, 6.08, 9.03$\mu$

EXAMPLE 3

*4-methylcarbonate of 4b-methyl-2-carbomethoxy-2-methallyl-7-ethylenedioxy-1,2,3,4,4a,4b,5,6,7,8,10,10a-dodecahydrophenanthrene-1,4-diol*

To a solution of 400 mg. of sodium borohydride in 50 ml. of methanol is added 0.5 ml. of pyridine, 1 ml. of water and 1.30 grams of 4-methylcarbonate of 4b-methyl-2-carbomethoxy-2-methallyl-7-ethylenedioxy-1,2,3,4,4a,4b,5,6,7,8,10,10a-dodecahydrophenanthrene-4-ol-1-one. After being allowed to stand at room temperature overnight, the reaction mixture is diluted with 100 ml. of water and the methanol is evaporated under vacuum. The aqueous residue is extracted with ether and the ether extract is dried with magnesium sulfate and evaporated to dryness. Recrystallization of the residue from aqueous methanol and then ether-petroleum ether gives pure product, melting point 112–113° C. $\lambda_{Max.}$ 2.88, 5.76, 5.90, 6.07$\mu$.

EXAMPLE 4

*4-lactone of 4b-methyl-2-carboxy-2-methallyl-7-ethylenedioxy-1,2,3,4,4a,4b,5,6,7,8,10,10a-dodecahydrophenanthrene-1,4-diol*

A solution of 800 mg. of the 4-methylcarbonate of 4b-methyl-2-carbomethoxy-2-methallyl-7-ethylenedioxy-1,2,3,4,4a,4b,5,6,7,8,10,10a-dodecahydrophenanthrene-1,4-diol in 20 mol. of methanol is treated with 10 ml. of 4 N potassium hydroxide solution and heated under reflux for four hours. Water is added to the reaction mixture, the methanol is distilled and the aqueous solution is acidified with excess sodium dihydrogen phosphate. The precipitated lactone is collected on a filter, washed with water and dried, and then recrystallized from acetone and ethyl ether; melting point 247–248° C.

$\lambda_{Max.}^{CHCl_3}$ 2.9, 5.67, 6.05$\mu$

EXAMPLE 5

*4-lactone of 4b-methyl-2-carboxy-2-methallyl-7-ethylenedioxy-1,2,3,4,4a,4b,5,6,7,8,10,10a-dodecahydrophenanthrene-4-ol-1-one*

A solution of 670 mg. of the 4-lactone of 4b-methyl-2-carboxy-2-methallyl-7-ethylenedioxy-1,2,3,4,4a,4b,5,6,7,8,10,10a-dodecahydrophenanthrene-1,4-diol in 7 ml. of pyridine is added to the chromium trioxidepyridine complex prepared by adding 670 mg. of chromium trioxide to 6 ml. of pyridine. After standing overnight at room temperature, the reaction mixture is diluted with 15 ml. of water and extracted four times with ether. The ether solution is washed with water, dried over magnesium sulfate and concentrated to dryness in vacuo. The crystalline residue is recrystallized from acetone-petroleum ether and methanol to give pure product, melting point 186–188° C. $\lambda_{Max.}$ 5.69, 5.81, 6.05$\mu$.

EXAMPLE 6

*4-methylcarbonate of 4b-methyl-1-ethoxyethinyl-2-carbomethoxy-2-methallyl-7-ethylenedioxy-1,2,3,4,4a,4b,5,6,7,8,10,10a-dodecahydrophenanthrene-1,4-diol*

To the ethyl magnesium bromide prepared from 1.44 grams of magnesium and excess ethyl bromide in 100 ml. of ether is added dropwise a solution of ethoxyacetylene in ether until the evolution of ethane ceased (approximately 3.5 grams of ethoxyacetylene in 5.3 ml. of ether is used). Benzene (30 ml.) is added to dissolve the oily ethoxyacetylene magnesium bromide and then .935 gram of the 4-methylcarbonate of 4b-methyl-2-carbomethoxy-2-methallyl-7-ethylenedioxy-1,2,3,4,4a,4b,5,6,7,8,10,10a-dodecahydrophenanthrene-1,4-diol. A dark precipitate separated which is stirred at room temperature overnight. Ice, water, ether and just sufficient saturated ammonium chloride solution to break the emulsion are added. The separated aqueous phase is extracted with ether and the combined ethereal solution is dried and concentrated to dryness in vacuo. The crude product is purified by absorption of a benzene solution onto 30.0 grams of alkaline alumina and elution with ether-petroleum ether. Further purification by recrystallization from dilute methanol and then ether-petroleum ether affords pure product, melting point 111–114° C.

$\lambda_{Max.}^{Nujol}$ 2.9–3.0, 4.49, 5.77, 5.85–5.90, 6.1$\mu$

EXAMPLE 7

*4b-methyl-2-carbomethoxy-2-methallyl-7-ethylenedioxy-1,2,3,4,4a,4b,5,6,7,8,10,10a-dodecahydrophenanthrene-1,4-dione*

To a solution of 1.56 grams of the 4b-methyl-2-carboalkoxy-7-ethylenedioxy-1,2,3,4,4a,4b,5,6,7,8,10a-dodecahydrophenanthrene-1,4-dione in 30 ml. of acetone is added three grams of anhydrous potassium carbonate and 2.5 ml. of methallyl iodide. The reaction mixture is stirred at room temperature overnight and then filtered. The filtrate is diluted with water and distilled under vacuum until all of the acetone is removed. Ether extraction followed by washing, drying and concentration of the ether solution provided crude product which is purified by passing an ether-petroleum ether solution over acid-washed alumina. The resulting crystalline product is recrystallized from ethanol and then ether-petroleum ether to afford pure product, melting point 0–92° C., $\lambda_{Max.}^{Nujol}$ 5.72, 5.83, 6.06, 9.07$\mu$ Any departure from the above description which conforms to the present invention is intended to be included within the scope of the claims.

What is claimed is:

1. A compound selected from the group consisting of 7-enol and 7-ketal derivatives of a compound having the formula—

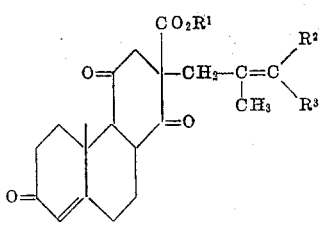

wherein $R^1$ is a hydrocarbon group containing less than 9 carbon atoms and $R^2$ and $R^3$ are selected from the group consisting of hydrogen and hydrocarbon groups containing less than nine carbon atoms and the 7-enol and 7-ketal substituents containing from 1 to 8 carbon atoms.

2. A 7-enol derivative of 4b-methyl-2-carbalkoxy-2-methallyl - 1,2,3,4,4a,4b,5,6,7,9,10,10a - dodecahydrophenanthrene-1,4,7-trione wherein the alkoxy group contains from one to eight carbon atoms and the 7-enol substituent containing from 1 to 8 carbon atoms.

3. A 7-ketal derivative of 4b-methyl-2-carbalkoxy-2-methallyl - 1,2,3,4,4a,4b,5,6,7,9,10,10a - dodecahydrophenanthrene-1,4,7-trione wherein the alkoxy group contains from one to eight carbon atoms and the 7-ketal substituent containing from 2 to 8 carbon atoms.

4. 4b-methyl-2-carbomethoxy-2-methallyl-7 - ethylenedioxy - 1,2,3,4,4a,4b,5,6,7,8,10,10a - dodecahydrophenanthrene-1,4-dione.

5. A process which comprises reacting a compound selected from the group consisting of 7-enol and 7-ketal derivatives of a compound having the formula—

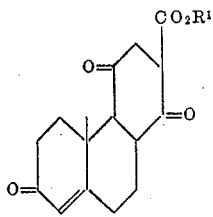

wherein $R^1$ is a hydrocarbon group with a 2-methyl allylic halide in the presence of a base to produce the corresponding 2-methallyl compound.

6. A process which comprises reacting a 7-enol derivative of a compound having the formula—

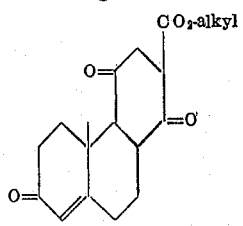

wherein the alkyl group contains from one to eight carbon atoms with a 2-methyl allylic halide in the presence of a base to produce the corresponding 7-enol derivative of 4b-methyl-2-carbalkoxy-2-methallyl - 1,2,3,4,4a,4b,5,6,7,9,10,10a-dodecahydrophenanthrene-1,4,7-trione.

7. A process which comprises reacting a 7-ketal derivative of a compound having the formula—

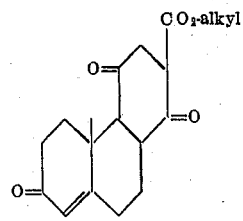

wherein the alkyl group contains from one to eight carbon atoms with a 2-methyl allylic halide in the presence of a base to produce the corresponding 7-ketal derivative of 4b-methyl-2-carbalkoxy-2-methallyl - 1,2,3,4,4a,4b,5,6,7,9,10,10a-dodecahydrophenanthrene-1,4,7-trione.

8. A process which comprises reacting 4b-methyl-2-carbomethoxy-7 - ethylenedioxy - 1,2,3,4,4a,5,6,8,10,10a-dodecahydrophenanthrene-1,4-dione with an alkali metal carbonate and methallyl bromide to produce 4b-methyl-2-carbomethoxy-2-methallyl-7-ethylenedioxy - 1,2,3,4,4a,4b, 5,6,7,8,10,10a-dodecahydrophenanthrene-1,4-dione.

References Cited in the file of this patent
UNITED STATES PATENTS

| | | |
|---|---|---|
| 2,407,672 | Milas | Sept. 17, 1946 |
| 2,459,834 | Miescher et al. | Jan. 25, 1949 |

OTHER REFERENCES

Sarrett et al.: Journal of the American Chemical Society 74, 4974–4976 (1952).

Lukes et al.: Journal of the American Chemical Society 75, 1708–1711 (1953).

Schmidlin et al.: Experientia XI, pages 365–366, September 15, 1955.